United States Patent
Brooks et al.

(10) Patent No.: US 10,514,672 B1
(45) Date of Patent: Dec. 24, 2019

(54) MACHINERY ACCIDENT PREVENTION SYSTEM

(71) Applicant: Little Feet Safety Systems LLC, Orlando, FL (US)

(72) Inventors: John R. Brooks, Orlando, FL (US); David Zima, Sorrento, FL (US)

( * ) Notice: Subject to any disclaimer, the term of this patent is extended or adjusted under 35 U.S.C. 154(b) by 258 days.

(21) Appl. No.: 15/357,113

(22) Filed: Nov. 21, 2016

Related U.S. Application Data (60) Provisional application No. 62/257,762, filed on Nov. 20, 2015.

(51) Int. Cl.
| | | |
|---|---|---|
| G08B 21/02 | (2006.01) | |
| G05B 19/042 | (2006.01) | |
| H04W 4/02 | (2018.01) | |

(52) U.S. Cl.
CPC ......... G05B 19/0428 (2013.01); G08B 21/02 (2013.01); H04W 4/023 (2013.01); H04W 4/027 (2013.01); G05B 2219/24024 (2013.01)

(58) Field of Classification Search
None
See application file for complete search history.

(56) References Cited

U.S. PATENT DOCUMENTS

| | | | |
|---|---|---|---|
| 6,963,278 B2 * | 11/2005 | Frame | B66C 15/045 340/539.22 |
| 7,088,284 B2 | 8/2006 | Young | |
| 7,868,721 B2 | 1/2011 | Fullerton et al. | |
| 7,890,235 B2 * | 2/2011 | Self | G01S 3/143 340/539.1 |
| 8,373,527 B2 | 2/2013 | Fullerton et al. | |
| 2002/0082803 A1 | 6/2002 | Schiffbauer | |
| 2007/0205861 A1 | 9/2007 | Nair | |
| 2010/0289662 A1 | 11/2010 | Dasilva | |
| 2014/0309918 A1 * | 10/2014 | Rivet | F16P 3/147 701/301 |

(Continued)

OTHER PUBLICATIONS

Office Action in U.S. Appl. No. 13/998,010 dated Apr. 20, 2015.
EFS file name 20170131_15-357113_IDS_NPL_Cite1.pdf.

(Continued)

*Primary Examiner* — Robert K Carpenter
(74) *Attorney, Agent, or Firm* — John M. Hammond; Patent Innovations LLC (57) ABSTRACT

A system for prevention of accidents by a hazardous machine. The system is comprised of a first subsystem on the machine, and a second subsystem wearable by a party to be protected. The first subsystem includes a base unit transceiver, and a processor in communication with the base unit transceiver, and in communication with a controller of the energy conversion device. The second subsystem includes a protected party remote transceiver in communication with the base unit transceiver. The processor executes an algorithm including detecting the location of the protected party remote transceiver relative to the base unit transceiver; determining if the location of the protected party remote transceiver relative to the base unit transceiver is less than a predetermined threshold distance; and halting operation of the energy conversion device of the protected party remote transceiver relative to the base unit transceiver is located at less than the threshold distance.

19 Claims, 3 Drawing Sheets

(56) References Cited

U.S. PATENT DOCUMENTS

| | | | |
|---|---|---|---|
| 2015/0084768 A1 | 3/2015 | Brooks | |
| 2016/0063893 A1* | 3/2016 | Kanuganti | G09B 21/001 |
| | | | 348/62 |
| 2018/0265080 A1* | 9/2018 | Funk | B60T 7/22 |

OTHER PUBLICATIONS

ST Microelectronics STEVAL-WESU1 "Getting started guide," Version 1.4 May 6, 2016. EFS file name 220170131_15-357113_IDS_NPL_Cite2.pdf.

ST Microelectronics STEVAL-WESU1 "Data brief," DocID029018 Rev 1 Mar. 2016. EFS file name 20170131_15-357113_IDS_NPL_Cite3.pdf.

ST Microelectronics STEVAL-WESU1 "UM2041 User manual," DocID029122 Rev 2 May 2016. EFS file name 20170131_15-357113_IDS_NPL_Cite4.pdf.

ST Microelectronics Open.MEMS software library listing obtained Jan. 31, 2017 at http://www.st.com/content/st_com/en/product-selector.html?querycriteria=productId=SC1998. EFS file name 20170131_15-357113_IDS_NPL_Cite5.pdf.

ST Microelectronics "BlueNRG-MS" Datasheet, DocID027103 Rev 7 Jan. 2017. EFS file name 20170131_15-357113_IDS_NPL_Cite6.pdf.

ST Microelectronics "LSM6DS3" Datasheet, DocID026899 Rev 8 Feb. 2016. EFS file name 20170131_15-357113_IDS_NPL_Cite7.pdf.

ST Microelectronics "LIS3MDL" Datasheet, DocID024204 Rev 4 May 2015. EFS file name 20170131_15-357113_IDS_NPL_Cite8.pdf.

ST Microelectronics "STC3115" Datasheet, DocID023755 Rev 7 Dec. 2014. EFS file name 20170131_15-357113_IDS_NPL_Cite9.pdf.

Texas Instruments "bq51003" Datasheet, SLUSBC8A—Dec. 2013—Revised Jun. 2016. EFS file name 20170131_15-357113_IDS_NPL_Cite10pdf.

* cited by examiner

MACHINERY ACCIDENT PREVENTION SYSTEM

CROSS-REFERENCE TO RELATED PATENT APPLICATIONS

This application claims priority from U.S. Provisional Patent Application No. 62/257,762 filed Nov. 20, 2016, the disclosure of which is incorporated herein by reference. This application is also related to U.S. patent application Ser. No. 13/998,010, the disclosure of which is incorporated herein by reference.

BACKGROUND

Description of Related Art

Technical Field

Systems for prevention of accidents when using machinery, and in certain embodiments, powered machinery and tools used in lawn and grounds maintenance, and farming.

DESCRIPTION OF RELATED ART

Preventable accidents involving machinery and equipment accounts for a significant number of injuries and fatalities each year worldwide. Often the victims are children. In the agricultural industry for example, one child dies every three days on US farms, usually due to machinery impact or entanglement. In addition, about 17,000 children under the age of 19 are injured each year in the US by lawn mowing equipment. About 600 to 800 of those children have limbs amputated, which is a rate of over two children per day each year in the US. There were 253,000 overall reported lawn mower accidents in 2010 as compared to the early 1980's where there were about 77,000 annually reported. Over 300,000 lawn mower accidents were reported in 2013. That is an increase of almost 50,000 victims from the 2010 statistics.

For decades, the agricultural and lawn mowing industries have relied solely on their existing safety features and equipment literature to prevent accidents. In spite of this, the accident trend has always increased. For farm equipment, lawn equipment, and other power implements, accident prevention in respect to bystanders (children, adults, or animals) depends solely on the observations of the operator, who is often subject to the sound and visual impairments of the machinery in use. Existing safety features on equipment such as operator presence controls (seat safety and deadman switch), power take off shields, mower blade shutdown when backing up, and discharge shields are very often bypassed, malfunction, or are removed.

The problem of existing safety features being bypassed because they are a nuisance to operation has been recognized since the early 1980's. Those features are basically the same in 2015 and the upward accident trend has continued. The No Mow in Reverse (NMR) feature actually has a forward facing factory by-pass switch provided by the manufacturer in most applications, for example. Safety feature designs for all types of potentially dangerous equipment have remained stagnant for decades and have lacked innovation, while the equipment itself has become more powerful, responsive, and efficient. For example, consumers are utilizing more "zero turn" mowers which are far more powerful, responsive, and quicker in turning than a typical riding lawn mower. However, they have the same basic safety features as a riding lawn mower.

All so-called "automatic" safety features on equipment are designed to be initiated by the operator performing a mechanical action, such as releasing a hand bar or getting up from the seat to shut off the equipment in time to prevent an unforeseen accident or impact. Existing safety features, Safety Tips from "experts", Public Service Announcements by physicians or accident victim's families, equipment manufacturers' instructions, warning labels on equipment, and awareness campaigns have not effectively reduced machinery or equipment accidents over the past four decades. To the contrary, these accidents have increased. These preventable accidents with machinery may vary with the type of equipment involved, such as lawn mowers, snow blowers, farm tractors, augers, wood chippers, ATV's, push mowers, chainsaws, weed eaters, edgers, skid steer loaders, etc. However, they often have accident scenarios in common, such as contact with cutting surfaces, flying debris injuries, being run over by the equipment, burn injuries, and roll over injuries. Accordingly there remains a need for a single accident prevention device that is effective in preventing all of the major accident types that occur across a broad range of powered tools, implements, and vehicles, and combinations thereof.

SUMMARY

The problem of machinery-related accidents as described above is solved by the machinery accident prevention (MAP) system disclosed herein. The system is provided to prevent an accident in which a hazardous machine injures a party or causes property damage. Typically, the hazardous machine is operated by a human operator, either directly, or remotely, and the system functions to prevent a "protected party" from injury by the hazardous machine.

In one aspect, the system is comprised of a set of transceivers in communication with each other. As used herein, the term "transceiver" is meant to indicate a communication device that can transmit electrical communication signals, and also receive electrical communication signals, including signals transmitted by other transceivers. Accordingly, the system is comprised of a first transceiver affixed to the hazardous machine, and referred to herein as a base communication unit, or simply a base unit. The system is further comprised of a second transceiver affixed to a protected party, such as a child or a pet. In certain embodiments, the system may be further comprised of a third transceiver affixed to the operator of the hazardous machine. The second transceiver and third transceiver are referred to herein as remote communication units, or simply remote units or remotes.

In operation of the system, when a potentially dangerous condition exists such as a condition in which an unobserved child (protected party) wanders too close to the hazardous machine, a first remote unit worn by the protected party transmits a signal to the base unit on the hazardous machine. The base unit receives the signal, and communicates the signal to a processor. The processor is in signal communication with a machine control circuit, which is activated upon the base unit receiving a signal from the remote unit of the protected party. The control circuit causes the hazardous machine to be shut down, i.e., it is de-energized and no longer continues to operate. In certain embodiments, the operator of the hazardous machine may also be wearing a second remote unit that receives the signal from the first remote unit of the protected party. The second remote unit also includes a processor in signal communication with an alarm device, which is activated upon the operator remote unit receiving a signal from the remote unit of the protected party. The processor signals the alarm device to activate, thereby warning the operator of the protected party having entered a hazardous zone proximate to the hazardous machine. The alarm may be a light, horn, buzzer, vibrator, or combinations thereof. In operation, the system thus prevents accidental injury to unobserved humans or animals and can reduce flying debris injuries to bystanders.

In certain embodiments, the base unit on the equipment has the capability of determining the slope or pitch of the equipment, and can sound an audible alert from the unit, or send a vibration to a wearable alarm device on the operator, and/or shut down the equipment when the manufacturer's specified slope limitations (or other specified limitations) are exceeded. For vehicular equipment in particular, such capability reduces rollover accidents.

Additionally, in certain embodiments, the base unit on the hazardous machine may sound an audible alert when the equipment has been shut down and is in a cool down cycle when a remote unit worn by a protected party or the operator is within certain proximity, thus reducing burn injuries to unwitting persons or animals approaching the hazardous machine.

In another embodiment of the accident prevention system, each individual remote unit is made communicable with any base unit, and each individual base unit is made communicable with any remote unit, thus providing a "universal" system. For example, if some or all hazardous machines in a neighborhood were affixed with a base unit and a child wearing a remote unit gets within certain proximity of any particular hazardous machine, that machine will be shut down. When the child is out of proximity of that machine, it can be restarted.

In another embodiment, the proximity activation range of individual remote units may be adjustable, such that a protected party wearing a remote unit may cause an equipment shut down at a further distance than that of an operator wearing a remote unit. The remote unit worn by the operator may have a much lesser proximity activation range, and may also have a "tap" feature on his remote unit to disable the equipment in the event that an emergency situation arises.

Another aspect of the system is that it is not equipment manufacturer dependent and can be utilized on any existing or new type of power equipment, appliance, or machinery. The system may function as a supplemental accident prevention feature that can instantly upgrade any potentially dangerous equipment, appliance, or machinery to a level of accident prevention far superior to current manufacturer offerings.

In another embodiment, the base and remote units may be provided with sleep and wake-up functions individually. For example, a remote unit worn by a protected party may be configured to wake on movement by the protected party, and to sleep when motionless. The base unit on the hazardous machine likewise may be configured to wake on movement of the machine it is installed upon, and to sleep when motionless; however the base unit may have a time delay for initiating sleep mode while the hazardous machine is in a cool down cycle.

In another embodiment, the base unit that is affixed to a gasoline engine powered hazardous machine, such as a chainsaw, push mower, wood-chipper, or weed eater, may be wired directly into the high voltage (i.e., in excess of 50,000 volts) spark plug circuit of the machine in applications where a low voltage ignition system on the engine does not exist. This provides a single base unit with the versatility to be installed on many different types of hazardous machines. The base unit may also be configured for low voltage hazardous machine control circuit disabling. The base unit may be configured to open a powered circuit, or close a ground circuit to disable the gasoline engine or other energy conversion device (e.g., an electric motor) to cause hazardous machine shutdown.

In another embodiment, the system may be configured to prevent the collision of equipment. For example, two jet skis with a base unit on each and remote units worn by each operator would shut down each jet ski when they become within a certain proximity of each other. The base units in the scenario would be set to activate shutdown when more than one remote unit signal is received.

In another embodiment, the system may be configured to prevent continued operation of the equipment when an operator goes outside of an adjustable proximity from the equipment, such as in the event of an operator falling off a tractor.

More particularly, in accordance with the present disclosure, a system for prevention of accidents by a hazardous machine is provided. The system is comprised of a first subsystem mounted on the machine, and a second subsystem wearable by a party to be protected by the system. The first subsystem includes a base unit transceiver, and a first processor in signal communication with the base unit transceiver, and in signal communication with a controller of the energy conversion device. The second subsystem includes a protected party remote transceiver in signal communication with the base unit transceiver. The first processor is configured to execute an algorithm including the steps of detecting the location of the protected party remote transceiver relative to the base unit transceiver; determining if the location of the protected party remote transceiver relative to the base unit transceiver is less than a predetermined threshold distance; and communicating a signal to the controller of the energy conversion device to halt operation of the energy conversion device if the location of the protected party remote transceiver relative to the base unit transceiver is less than the predetermined threshold distance.

The second subsystem may include an accelerometer in signal communication with the protected party remote transceiver. In such embodiments, the algorithm executable by the first processor includes steps to perform real time activity recognition of the protected party based upon accelerometer data communicated by the protected party remote transceiver to the base unit transceiver. The algorithm may include includes steps to detect velocity and acceleration of the protected party relative to the base unit transceiver based upon accelerometer data communicated by the protected party remote transceiver to the base unit transceiver. In such embodiments, the algorithm may include steps of determining if the location of the protected party remote transceiver relative to the base unit transceiver will be less than the predetermined threshold distance within a predetermined threshold time; and communicating a signal to the controller of the energy conversion device to halt operation of the energy conversion device if the location of the protected party remote transceiver relative to the base unit transceiver will be less than the predetermined threshold distance within the predetermined threshold time.

In certain embodiments, the first subsystem may be further comprised of an accelerometer in signal communication with the first processor. In such embodiments, the algorithm executable by the first processor includes steps of determining if the pitch of the hazardous machine exceeds a predetermined degree of deviation relative to horizontal level, and communicating a signal to the controller of the energy conversion device to halt operation of the energy conversion device if the level of the hazardous machine exceeds the predetermined degree of deviation relative to horizontal level. The algorithm executable by the first processor may include steps of detecting velocity and acceleration of the hazardous machine to the base unit transceiver based upon accelerometer data; and determining if the level of the hazardous machine will exceed a predetermined degree of deviation relative to horizontal level within a predetermined threshold time; and communicating a signal to the controller of the energy conversion device to halt operation of the energy conversion device if the level of the hazardous machine will exceed a predetermined degree of deviation relative to horizontal level within the predetermined threshold time.

The algorithm may include steps of determining if the hazardous machine has been inoperable for a period of time exceeding a threshold period of time, and if the threshold period of time is exceeded, causing the first subsystem to transition to a low-power consumption mode. The algorithm may further include steps of determining if the hazardous machine has been restarted following a period of being inoperable, causing the first subsystem to an operation mode.

In certain embodiments, the base unit transceiver may be integrated into the first processor. The first processor may be a microwave single-mode radio network processor.

In certain embodiments, the system may include a third subsystem wearable by an operator of the hazardous machine, and comprising an operator remote transceiver in signal communication with the base unit transceiver. In such embodiments, the algorithm executable by the first processor includes steps of detecting the location of the operator remote transceiver relative to the base unit transceiver; determining if the location of the operator remote transceiver relative to the base unit transceiver is less than an operator predetermined threshold distance; and communicating a signal to the controller of the energy conversion device to halt operation of the energy conversion device if the location of the operator remote transceiver relative to the base unit transceiver is less than the operator predetermined threshold distance.

The third subsystem may include a second processor in signal communication with the operator remote transceiver. In such embodiments, the second processor may be in signal communication with the operator remote transceiver, the second subsystem may include an alarm communicable to the operator; and the second processor may be configured to execute an algorithm including the steps of detecting the location of the protected party remote transceiver relative to the base unit transceiver; determining if the location of the protected party remote transceiver relative to the base unit transceiver is less than a predetermined threshold distance; and communicating a signal to the alarm if the location of the protected party remote transceiver relative to the base unit transceiver is less than the predetermined threshold distance.

In certain embodiments, the first processor and the second processor may be in signal communication with a remote programming device. The device may be a dedicated handheld remote, or a wireless communication device such as a smart phone or tablet.

In certain embodiments, the energy conversion device may be an internal combustion engine. In such embodiments, a high voltage on-off switch disposed between a high voltage electrical source and a spark plug. Alternatively, the controller may be comprised of a low voltage switch disposed in an electrical ignition circuit and operable to halt or allow voltage supply to a spark plug.

The system may be expanded to operate as a "universal system" that protects multiple protected parties from multiple hazardous machines. Such a system includes a plurality of additional first subsystems mounted on a plurality of hazardous machines, and a plurality of additional second subsystems worn by a plurality of protected parties. In such a system, the plurality of additional first subsystems each comprises a base unit transceiver and a first processor. The plurality of additional second subsystems each comprises a protected party remote transceiver, each worn by an additional protected party. Each of the base unit transceivers is in signal communication with all of the protected party remote transceivers, and each of the protected party remote transceivers is in signal communication with all of the base unit transceivers. Each of the first processors of the first subsystems is configured to execute an algorithm including the steps of detecting the location of any of the protected party remote transceivers relative to the base unit transceiver in signal communication with that first processor; determining if the location of any of the protected party remote transceivers relative to the base unit transceiver is less than the predetermined threshold distance; and communicating a signal to the controller of the energy conversion device of that hazardous machine to halt operation of the energy conversion device if the location of any of the protected party remote transceivers relative to the base unit transceiver is less than the predetermined threshold distance.

Additional aspects of the accident prevention system include it being universal for all brands and types of power equipment (i.e., non-manufacturer dependent), with base units capable of being connected directly into the existing high voltage spark plug circuit of equipment, capable of being connected into low voltage equipment control circuits as well, having universal activation for unlimited types of equipment and appliances from any single remote unit, having sleep and wake functions of both base units and remote units, the ability to prevent multiple types of accidents with a single system, proximity protection for non-operators/bystanders, usable as a preventative tool for safety training children or personnel without the risk of catastrophic injury, and capable of providing warning of the risk of an impending equipment rollover.

BRIEF DESCRIPTION OF THE DRAWINGS

The present disclosure will be provided with reference to the following drawings, in which like numerals refer to like elements, and in which.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present invention, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the present invention is described in the context of its use in preventing accidents in the use of powered machinery and tools used in lawn and grounds maintenance, and farming. However, it is not to be construed as being limited only to use in such applications. The invention is adaptable to any use in which accident prevention is desirable when operating an energy-driven device, or when in proximity to highly energized objects such as high voltage electrical equipment, high temperature objects, high radiation objects, high velocity objects, and highly pressurized objects.

Additionally, this disclosure may identify certain components with the adjectives "top," "upper," "bottom," "lower," "left," "right," etc. These adjectives are provided in the context of use of the MAP system in a particular exemplary application, and/or in the context of the orientation of the drawings. The description is not to be construed as limiting the MAP system to use in a particular spatial orientation. The instant system may be used in orientations other than those shown and described herein.

In describing the present system for accident prevention, terms such as machine, machinery, tool, equipment, and appliance may be used to describe powered or energized devices to which the system is applicable, and upon which the system may be installed. These terms are used interchangeably and without limitation.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

Figure 1:
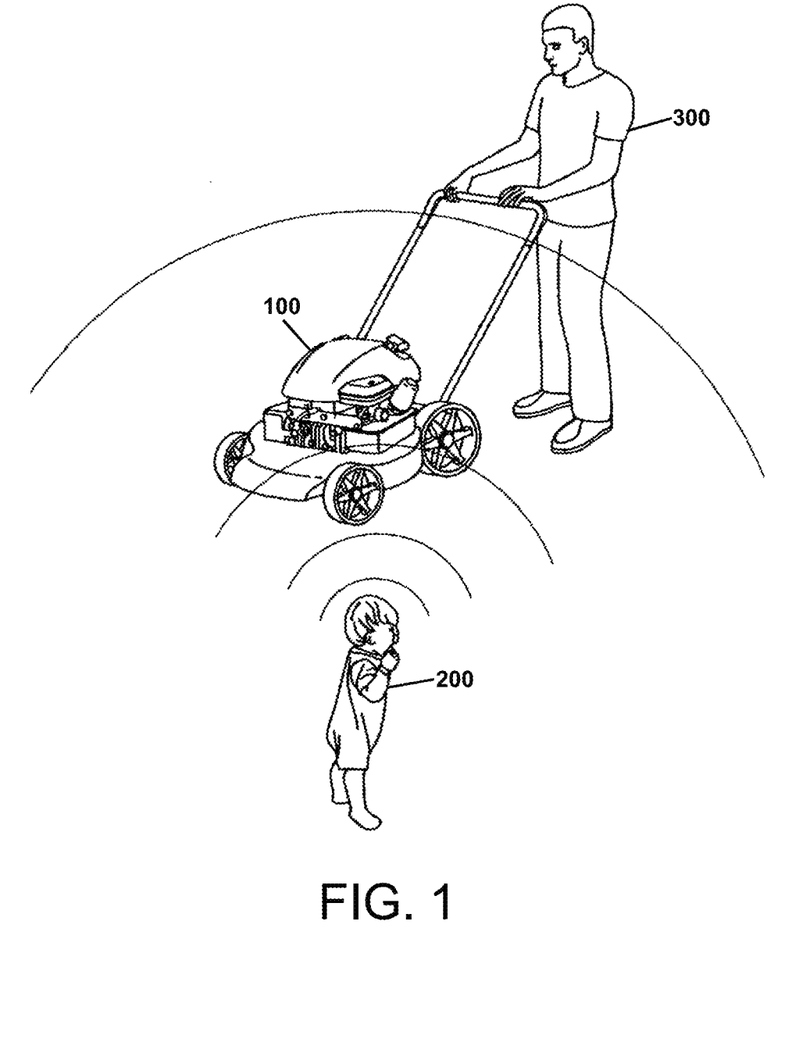
FIG. 1 is an exemplary illustration of the machinery accident prevention (MAP) system of the present disclosure as applied to the protection of a child from the hazard of a lawn mower.

FIG. 1 is an exemplary illustration of the machinery accident prevention (MAP) system of the present disclosure as applied to the protection of a child from the hazardous situation of being in too close proximity to a lawn mower. In the situation depicted in FIG. 1, the hazardous machine 100 is the lawn mower being operated by the machine operator 300, with the child being the protected party 200.

Figure 2:
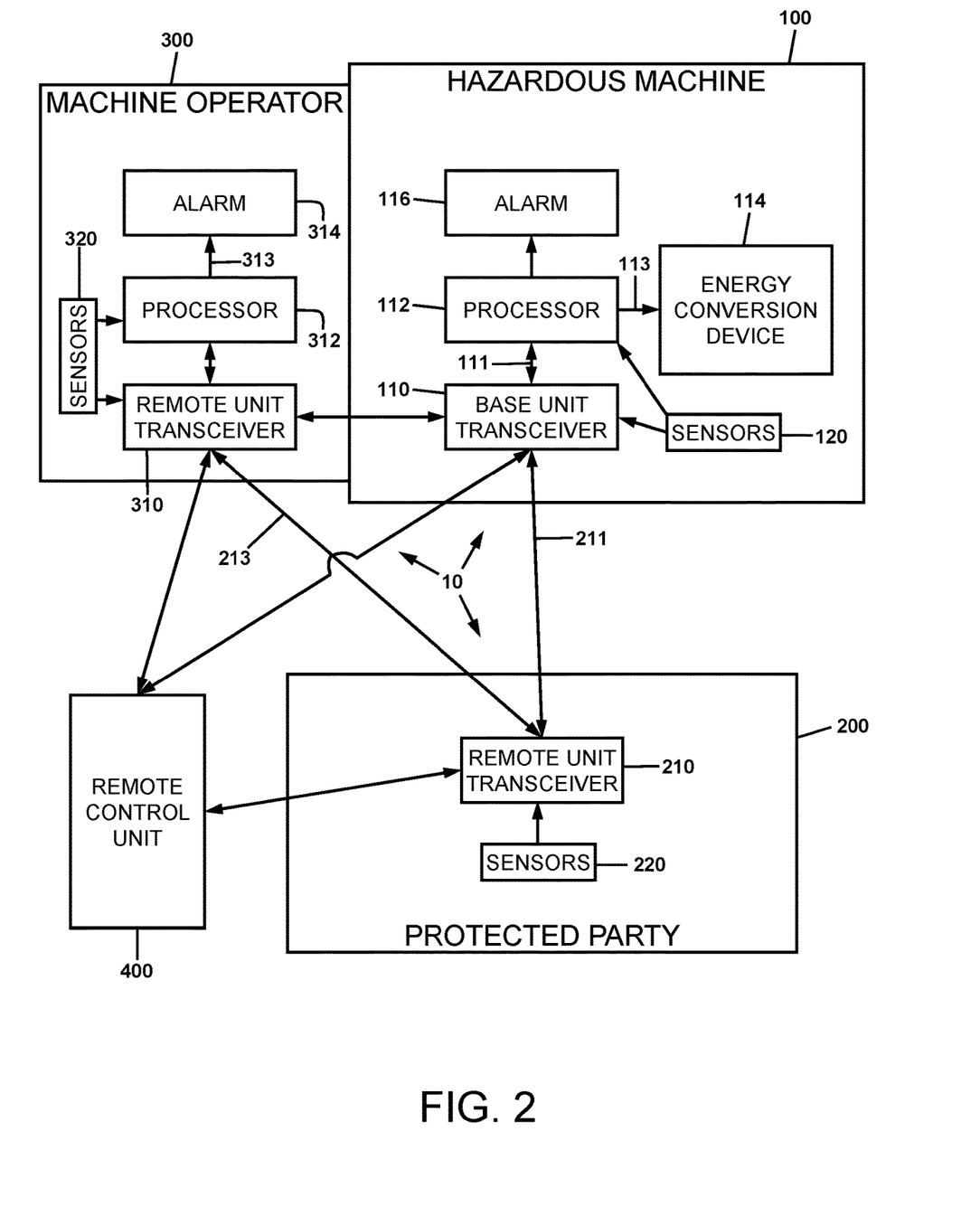
FIG. 2 is a block diagram of one embodiment of the instant MAP system.

Referring now to FIG. 2, the MAP system 10 is comprised of a first transceiver 110 affixed to the hazardous machine 100, referred to herein as a base unit 110. The system 10 is further comprised of a second transceiver 210 affixed to a protected party 200. In certain embodiments, the system 10 may be further comprised of a third transceiver 310 affixed to the operator 300 of the hazardous machine 100. The second transceiver 210 and third transceiver 310 are referred to herein as remote communication units, or simply remote units 210 and 310.

In operation of the system 10, when a potentially dangerous condition exists such as depicted in FIG. 1 in which an unobserved child (protected party) wanders too close to the hazardous machine, a first remote unit 210 worn by the protected party 200 transmits a signal as indicated by arrow 211 to the base unit 110 on the hazardous machine 100. The base unit 110 receives the signal, and communicates the signal to a processor 112 as indicated by arrow 111. The processor 112 may be a central processing unit (CPU) or an application specific integrated circuit (ASIC), or other suitable computer processor used in control of machines, appliances, or other powered devices. The processor 112 is in signal communication as indicated by arrow 113 with a controller or control circuit (not shown) of an energy conversion device 114. The energy conversion device 114 may be a gasoline or diesel engine, or an electric motor, which converts energy in the form of fuel or electrical energy to mechanical energy, typically of a moving part such as a cutting blade, chain, or other dangerous object. Alternatively, the energy conversion device may be an object energized to a high electrical voltage.

In any case, the electrical control circuit of the energy conversion device 114 is activated upon the base unit 110 receiving a signal from the remote unit 210 of the protected party 200 that is indicative of the protected party being within a first predetermined threshold distance from the hazardous machine, or imminently approaching the threshold distance. The control circuit causes the hazardous machine 100 to be shut down, i.e., the energy conversion device 114 is de-energized and no longer continues to operate.

In certain embodiments, the operator 300 of the hazardous machine 100 may also be wearing a second remote unit 310 that receives the signal as indicated by arrow 213 from the first remote unit 210 of the protected party 200. The second remote unit 310 may also include a processor 312 in signal communication as indicated by arrow 313 with an alarm device 314, which is activated upon the operator remote unit 310 receiving a signal from the remote unit 210 of the protected party 200 that is indicative of the protected party being within or approaching the threshold distance. The processor 312 signals the alarm device 314 to activate, thereby warning the operator 300 of the protected party 200 having entered a hazardous zone proximate to the hazardous machine 100. The alarm 314 may be a light, horn, buzzer, vibrator, or combinations thereof. In operation, the system 10 thus prevents accidental injury to unobserved humans or animals and can reduce flying debris injuries to bystanders.

In certain embodiments, the base unit 110 on the hazardous machine 100 has the capability of determining the slope or pitch, i.e. the degree of deviation from horizontal level of the hazardous machine 100, and can sound an audible, light, or vibrational alert from an alarm 116 in signal communication with the unit 110, or send a vibration to a wearable alarm device 314 on the operator 300, and/or shut down the hazardous machine 100 when the manufacturer's specified slope limitations (or other specified limitations) are exceeded. For vehicular equipment in particular, such capability reduces rollover accidents.

Additionally, in certain embodiments, the base unit 110 on the hazardous machine 100 may sound an audible alert when the hazardous machine 100 has been shut down and is in a cool down period and operator 300 or protected party 200 is within certain proximity, thus reducing burn injuries to unwitting persons or animals approaching the hazardous machine 100.

In another embodiment (not shown) of the MAP system 10, the system 10 is comprised of a plurality of base units 110, as well as a plurality of remote units 210 and/or 310. In such an embodiment, each individual remote unit is made communicable with any base unit, and each individual base unit is made communicable with any remote unit, thus providing a "universal" system. For example, if some or all hazardous machines 100 in a neighborhood were each equipped with a base unit, and any child wearing a remote unit gets within a certain proximity of any particular hazardous machine, that machine will be shut down. When the child is out of proximity of that machine, it can be restarted.

In another embodiment, the proximity activation range of individual remote units may be made adjustable, such that a protected party 200 wearing a remote unit 210 may cause an equipment shut down at a further distance than that of an operator 300 wearing a remote unit 310. The remote unit 310 worn by the operator 300 may have a much lesser proximity activation range, and may also have a "tap" feature such as a push button, in order for the operator 300 to disable the hazardous machine 100 in the event that an emergency situation arises.

In another embodiment, the base unit 110 that is affixed to a gasoline engine powered hazardous machine 100, such as a chainsaw, push mower, wood-chipper, or weed eater, may be wired directly into the high voltage spark plug circuit of the machine 100 in applications where a low voltage ignition system on the engine does not exist. This provides a single base unit 110 with the versatility to be installed on many different types of hazardous machines 100. The base unit 100 may also be configured for low voltage hazardous machine control circuit disabling, such as closing of a fuel line solenoid valve. The base unit 100 may be configured to open a powered circuit, or close a ground circuit to disable the gasoline engine or other energy conversion device (e.g., an electric motor) to cause hazardous machine shutdown. As used herein, with regard to spark ignition internal combustion engines, the term "high voltage" refers to the voltage required to cause a spark discharge at a spark plug, i.e., voltages on the order of tens of thousands of volts; and the term "low voltage" refers to voltages in the electrical or electronic ignition circuits, typically on the order of less than 100 volts, and more typically, 3-24 volts.

Referring again to FIG. 2, in another embodiment, the MAP system 10 may include a remote control unit 400, which is in signal communication with the base unit 110 of the hazardous machine, and/or the remote unit transceivers 210 and 310 of the protected party 200 and the machine operator 300. In certain embodiments, the remote unit 400 may be a dedicated "remote" used only for the purpose of communication with the base unit 110 and remote unit transceivers 210 and 310. In other embodiments, the remote unit may be a smartphone (such as Android or iPhone), or other portable wireless communication device, containing an executable program and screen-displayed graphical user interface (an "app") for the communication. Such communication may include the inputting of certain parameters such as proximity activation ranges described previously, and the receiving of data from sensors on the subsystems worn by the machine operator 300 and protected party 200, and from sensors on the hazardous machine 100. In certain embodiments, the processors 112 and 312 may be integrated with the respective associated transceivers 110 and 310. The processors 112 and 312 may be low power microwave low energy single-mode radio network processors. Such processors are compatible and compliant with many existing smartphone interfaces and Bluetooth specification v4.1. In such embodiments, the processors can function as a master or slave. Additionally, an application layer based on unique, microwave, low-energy protocol streams data from different devices (inertial and environmental sensors plus battery devices and RSSI) and algorithms, while a serial console over the protocol allows control over the configuration parameters of the connected devices. Such capability may be provided, for example, by use of a BlueNRG-MS Bluetooth Low Energy Network Processor sold by STMicroelectronics of Geneva, Switzerland.

Figure 3:
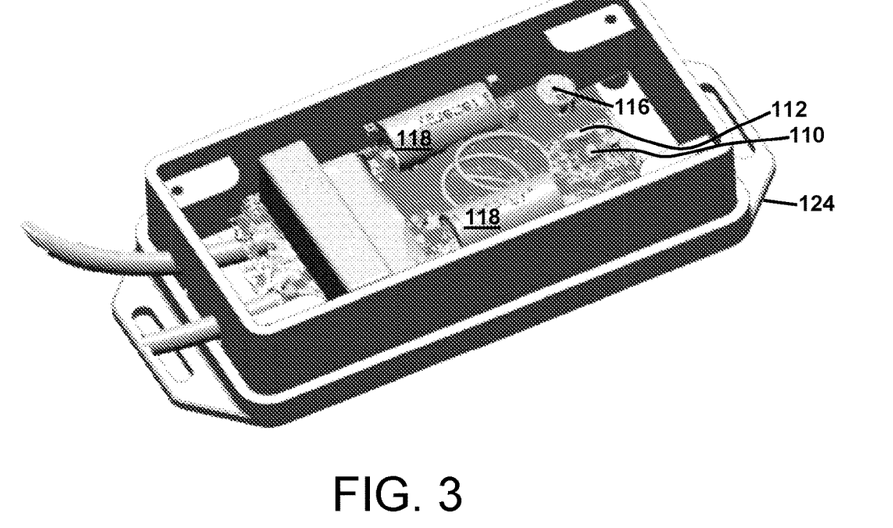
FIG. 3 is a perspective view of a housing-contained transceiver base unit in accordance with the present disclosure.
Figure 4:
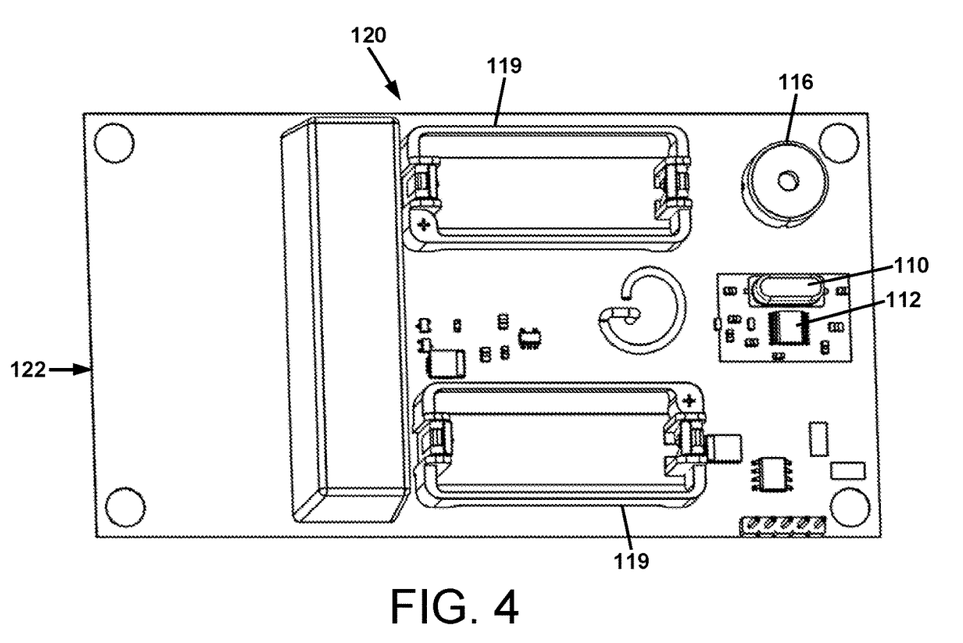
FIG. 4 is a detailed view of the transceiver base unit of FIG. 3.

FIGS. 3 and 4 depict an exemplary transceiver base unit subsystem 120, the components of which are mounted on a circuit board 122 and disposed in a housing 124. Transceiver base unit subsystem 120 is comprised of base unit transceiver 110, processor 112, alarm 116, and batteries 118 held in battery housings 119. Certain advantageous features of base unit transceiver 110, and remote unit transceivers 210 and 310, and their associated subsystems will now be described. It is to be understood that the configuration of the transceiver base unit subsystems 120 as depicted in FIGS. 3 and 4 is exemplary, and that other configurations are suitable, including additional electronic components and electrical connections not shown.

In certain embodiments, the subsystems of the hazardous machine 100, the protected party 200, and/or the machine operator 300 may include sensors 120, 220, and 320, respectively. Such sensors may include, without limitation, motion, velocity, and acceleration detectors such as accelerometers, gyroscopes, or magnetic sensors; temperature sensors for temperature compensation, and pressure sensors. The sensors 220 in the subsystem of the protected party 200 are in communication with the transceiver 210 of that subsystem, which is in communication with the transceiver 310 of the machine operator 300 and the transceiver 110 of the hazardous machine 100. Thus the data from the sensors 120, 220, and 320 is communicable to the processor 312 of the machine operator 300 and the processor 112 of the hazardous machine 100, for the purpose of executing certain algorithms for protection of the protected party. Additionally, the sensor data may be communicated to the remote control unit 400 for analysis and for optimizing protective algorithms and inputting certain parameters such as proximity activation ranges to the processors 112 and 312.

In certain embodiments, the sensors 120, 220, and 320 employ motion algorithms for motion tracking and safety advisement. The sensors may be integrated with the respective processors 112 and/or 312, and may be provided with extremely low power capabilities and advanced performance in terms of accuracy and embedded digital function with the processors 112 and 312. In the operation of the MAP system 10, in certain embodiments, in an algorithm executable by the processor 112 and/or the processor 312, a complete framework is integrated into Remote using inertial and environmental sensor drivers, battery profile measurements, and unique low-energy microwave technology for data communication. Additionally, the algorithm may include real-time activity-recognition based on accelerometer data. Such capability may be provided, for example, by use of the application of software algorithms provided in the Open.MEMS software library of the aforementioned STMicroelectronics.

In certain embodiments, the sensors 120, 220, and 320 may include a 3D digital accelerometer and a 3D digital gyroscope, such as a model LSM6DS3 digital accelerometer/gyroscope sold by STMicroelectronics, configured to operate at an ultra-low power level. Advantageously, this enables an always-on low-power function for the respective subsystems, thus providing an optimal motion and safety detection state while extending battery life.

In certain embodiments, the sensors may include an ultra-low-power, high performance, three-axis magnetic sensor, such as a model LIS3MDL 3-axis magnetometer sold by STMicroelectronics, which provides user-selectable full scales of gauss for function control and resolution. In such embodiments, the MAP system 10 may be configured to generate interrupt signals for magnetic field detection which can assist in detection of safety status change.

The algorithms executable by the processor 112 and/or the processor 312 may further include a "gas gauge" for battery monitoring, which may be implemented through current sensing by coulomb counting and accurate measurements of the battery voltage to estimate the state-of-charge (SOC) of the Remote and Base power status. Such capability may be provided, for example, by use of a model STC3115 integrated circuit sold by STMicroelectronics.

In certain embodiments of the MAP system 10, in at least one of the processors 112 or 312, an advanced, integrated, receiver integrated circuit is employed for wireless power transfer and optimized for the Remote device. The device provides the AC-DC power conversion while integrating the digital controller. Together with the associated power transmitter controller, the power receiver allows for a complete contact-less power transfer system for wireless power. A near-field inductive power transfer method is utilized with a receiver coil embedded in the portable device which receives the power transmitted by the transmitter coil through mutually coupled inductors. The AC signal from the receiver coil is then rectified and regulated to be used as a power supply. Global feedback is established from the secondary to the transmitter to stabilize the power transfer process through back-scatter modulation. The device integrates a low-impedance full synchronous rectifier, low-dropout regulator, digital control, and accurate voltage and current loops. One suitable exemplary integrated circuit device is the BQ51003 device manufactured and sold by the Texas Instruments Inc. of Dallas, Tex.

In another embodiment, the transceiver subsystems of base unit 110 and remote units 210 and 310 may be provided with sleep and wake-up functions individually. For example, remote unit 210 worn by a protected party 200 may be configured to wake on movement by the protected party 200, and to sleep when motionless. The base unit 110 on the hazardous machine 100 likewise may be configured to wake on movement of the hazardous machine 100, and to sleep when motionless. In certain embodiments, the base unit 100 may have a time delay for initiating sleep mode while the hazardous machine 100 is in a cool down cycle. Such sleep and wake-up functions conserve battery power and extend battery life significantly in the transceiver subsystems. Additionally, the base and remote units 110, 210, and 310 are powered from high-capacity/am pacity batteries for non-nuisance replacement and long-life operation. It is noted that the base unit 110 therefore does not require any power to be supplied from the hazardous machine 100 in order to operate.

In certain embodiments, the transceivers 110, 210, and 310 employ and communicate via a unique fractional-n synthesized based, negative-impedance Colpitts based or hybridized radio. The transceivers 110, 210, and 310 may operate in E-Field for optimum signal propagation. It is noted that the Transceivers 110, 210, and 310 do not employ commonly practiced RFID or H-Field propagation. Additionally, the transceivers 110, 210, and 310 are not directional, but instead may employ an omnidirectional Marconian or Hertzian antenna (not shown). Such antenna does not employ ferrite core or H-Field, and also does not use a fixed axis of propagation.

Transceivers 110, 210, and 310 are further provided with at least one of the following advantageous features and/or capabilities:

Transceivers 110, 210, and 310 employ both asynchronous and synchronous physical layer modulation and data recovery.

Transceivers 110, 210, and 310 employ a product specific medium access layer (MAC) and application product layer (API) which assure a ubiquitous country specific functionality.

Transceivers 110, 210, and 310 may also employ bit voting and sliding median filters for low-level digital signal processing (DSP) process gain.

Transceivers 110, 210, and 310 may utilize a single frequency for ubiquitous function in all localities.

Transceivers 110, 210, and 310 may use a unique motion detection algorithm to become active and communicate with its associated device. Such algorithm enables the wake and sleep mode functionality.

Transceivers 110, 210, and 310 use a digital RSSI (received signal strength indicator) for link margin optimization between base and remote units.

Transceivers 110, 210, and 310 may utilize digitally controlled output power for link margin maintenance.

In certain embodiments, the transceiver subsystem that includes the base transceiver 110, and the transceiver subsystems that includes the respective remote transceivers 210 and 310 include accelerometers (not shown). Such accelerometers may be in communication with the respective subsystem processors, which are programmed with algorithms for advanced motion detection and additional algorithms to determine unit status for safety monitoring and maintenance. Such accelerometers may also be used in detection of excessive tilt or pitch, thereby enabling prevention of rollover accidents as described previously.

In certain embodiments, the transceiver subsystem that includes the base transceiver 110, and the transceiver subsystems that includes the respective remote transceivers 210 and 310 include employ an audible alert to confirm base and remote communication with adequate link margin. The respective processors 112, 212, and 312 are provided with programmable capability with regard to minimum required motion to activate safety features.

In certain embodiments, the transceiver subsystem that includes the base device 110 is configurable with respect to a relay function. Such base unit subsystem can provide a NO (normally open) or NC (normally closed) state in response to a safety condition that requires equipment shutdown. Additionally, the base unit subsystem can preemptively prevent initial startup or operation of the hazardous machine 100 if a hazard safety condition is received from one of the remote units 210 and/or 310.

Processors and integrated sensors that are capable of being modified, configured and programmed for the operations disclosed herein may be obtained from e.g., STMicroelectronics of Geneva, Switzerland. Suitable integrated processor and sensor systems include, without limitation, the STEVAL-WESU1 Wearable sensor unit, as described in the DocID029018 of March 2016.

It is therefore apparent that there has been provided, in accordance with the present disclosure, a system for prevention of accidents when using hazardous machines. Having thus described the basic concept of the invention, it will be apparent to those skilled in the art that the foregoing detailed disclosure is intended to be presented by way of example only, and is not limiting. Various alterations, improvements, and modifications will occur to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order.

What is claimed is:

1. A system for prevention of accidents by a hazardous machine comprised of an energy conversion device, the system comprising:
   a) a first subsystem mounted on the machine and comprising:
      a base unit transceiver;
      a first network processor in microwave single mode radio signal communication with the base unit transceiver, and in signal communication with a controller of the energy conversion device; and
   b) a second subsystem wearable by a party to be protected by the system, and comprising a protected party remote transceiver in microwave single mode radio signal communication with the base unit transceiver;
   wherein the first processor is configured to execute an algorithm including the steps of seeking a microwave single mode radio signal, and if a microwave single mode radio signal is found, identifying if the single mode radio signal is from the protected party remote transceiver, analyzing the single mode radio signal and determining if the distance of the protected party remote transceiver from the base unit transceiver is less than a predetermined protected party threshold distance; and communicating a signal to the controller of the energy conversion device to halt operation of the energy conversion device if the distance of the protected party remote transceiver from the base unit transceiver is less than the predetermined protected party threshold distance; and
   wherein the microwave single mode radio signal communication of the first network processor with the base unit transceiver and the microwave single mode radio signal communication of the protected party remote transceiver with the base unit transceiver are fractional-n synthesized based, negative-impedance hybridized radio signals operating in E-field for propagation.

2. The system of claim 1, wherein the second subsystem is further comprised of an accelerometer in signal communication with the protected party remote transceiver, and wherein the algorithm executable by the first processor includes steps to perform real time activity recognition of the protected party based upon accelerometer data communicated by the protected party remote transceiver to the base unit transceiver.

3. The system of claim 1, wherein the second subsystem is further comprised of an accelerometer in signal communication with the protected party remote transceiver, and wherein the algorithm executable by the first processor includes steps to detect velocity and acceleration of the protected party relative to the base unit transceiver based upon accelerometer data communicated by the protected party remote transceiver to the base unit transceiver.

4. The system of claim 3, wherein the algorithm further includes steps of determining if the distance of the protected party remote transceiver from the base unit transceiver will be less than the predetermined threshold distance within a predetermined threshold time; and communicating a signal to the controller of the energy conversion device to halt operation of the energy conversion device if the distance of the protected party remote transceiver from the base unit transceiver will be less than the predetermined threshold distance within the predetermined threshold time.

5. The system of claim 1, wherein the first subsystem is further comprised of an accelerometer in signal communication with the first processor, and wherein the algorithm executable by the first processor includes steps of determining if the level of the hazardous machine exceeds a predetermined degree of deviation relative to horizontal level, and communicating a signal to the controller of the energy conversion device to halt operation of the energy conversion device if the level of the hazardous machine exceeds the predetermined degree of deviation relative to horizontal level.

6. The system of claim 5, wherein the algorithm executable by the first processor includes steps of detecting velocity and acceleration of the hazardous machine to the base unit transceiver based upon accelerometer data; and determining if the pitch of the hazardous machine will exceed a predetermined degree of deviation relative to horizontal level within a predetermined threshold time; and communicating a signal to the controller of the energy conversion device to halt operation of the energy conversion device if the level of the hazardous machine will exceed a predetermined degree of deviation relative to horizontal level within the predetermined threshold time.

7. The system of claim 1, wherein the algorithm executable by the first processor includes steps of determining if the hazardous machine has been inoperable for a period of time exceeding a threshold period of time, and if the threshold period of time is exceeded, causing the first subsystem to transition to a low-power consumption mode.

8. The system of claim 7, wherein the algorithm includes steps of determining if the hazardous machine has been restarted following a period of being inoperable, and causing the first subsystem to resume an operation mode.

9. A system for prevention of accidents by a hazardous machine comprised of an energy conversion device, the system comprising:
   a) a first subsystem mounted on the machine and comprising:
      a base unit transceiver;
      a first network processor in microwave single mode radio signal communication with the base unit transceiver, and in signal communication with a controller of the energy conversion device;
   b) a second subsystem wearable by a party to be protected by the system, and comprising a protected party remote transceiver in microwave single mode radio signal communication with the base unit transceiver; and
   c) a 3D digital accelerometer continuously operable at a low power level; wherein the first processor is configured to execute an algorithm including the steps of seeking a microwave single mode radio signal, and if a microwave single mode radio signal is found, identifying if the single mode radio signal is from the protected party remote transceiver, analyzing the single mode radio signal and determining if the distance of the protected party remote transceiver from the base unit transceiver is less than a predetermined protected party threshold distance; and communicating a signal to the controller of the energy conversion device to halt operation of the energy conversion device if the distance of the protected party remote transceiver from the base unit transceiver is less than the predetermined protected party threshold distance; and wherein the first subsystem and the second subsystem are operable to transition from a sleep mode during a period of no relative motion between the first subsystem and the second subsystem to a detecting mode when relative motion between the first subsystem and the second subsystem is sensed by the accelerometer.

10. The system of claim 9, wherein the microwave single mode radio signal communication of the first network processor with the base unit transceiver and the microwave single mode radio signal communication of the protected party remote transceiver with the base unit transceiver are each transmitted through an omnidirectional antenna having a variable axis of propagation.

11. The system of claim 9, wherein the energy conversion device is an internal combustion engine, and wherein the controller is comprised of a high voltage on-off switch disposed between a high voltage electrical source and a spark plug of the internal combustion engine.

12. The system of claim 9, wherein the energy conversion device is an internal combustion engine, and wherein the controller is comprised of a low voltage switch disposed in an electrical ignition circuit and operable to halt or allow voltage supply to a spark plug of the internal combustion engine.

13. The system of claim 9, further comprising a third subsystem wearable by an operator of the hazardous machine, and comprising an operator remote transceiver in microwave single mode radio signal communication with the base unit transceiver.

14. The system of claim 13, wherein the algorithm includes steps of detecting the distance of the operator remote transceiver from the base unit transceiver; determining if the distance of the operator remote transceiver from the base unit transceiver is less than an operator predetermined threshold distance; and communicating a signal to the controller of the energy conversion device to halt operation of the energy conversion device if the distance of the operator remote transceiver from the base unit transceiver is less than the operator predetermined threshold distance.

15. The system of claim 13, wherein the third subsystem is comprised of a second network processor in microwave single mode radio signal communication with the operator remote transceiver.

16. The system of claim 15, wherein the second subsystem includes an alarm communicable to the operator, and the second network processor is configured to execute an algorithm including the steps of detecting the distance of the protected party remote transceiver from the base unit transceiver; determining if the distance of the protected party remote transceiver from the base unit transceiver is less than an operator predetermined threshold distance; and communicating a signal to the alarm if the distance of the protected party remote transceiver from the base unit transceiver is less than the operator predetermined threshold distance.

17. The system of claim 15, wherein the first network processor and the second network processor are in microwave single mode radio signal communication with a remote programming device, and wherein the remote programming device is operable to select and communicate the protected party threshold distance to the first network processor and select and communicate the operator threshold distance to the second network processor.

18. The system of claim 9, further comprising a plurality of additional first subsystems each comprising a base unit transceiver and a first processor, and a plurality of additional second subsystems each comprising a protected party remote transceiver, and each worn by an additional protected party, wherein each of the base unit transceivers is in microwave single mode radio signal communication with all of the protected party remote transceivers, and each of the protected party remote transceivers is in microwave single mode radio signal communication with all of the base unit transceivers.

19. The system of claim 18, wherein each of the first processors of the first subsystems is configured to execute an algorithm including the steps of detecting the distance of any of the protected party remote transceivers from the base unit transceiver in signal communication with that first processor; determining if the distance of any of the protected party remote transceivers from the base unit transceiver is less than the predetermined threshold distance; and communicating a signal to the controller of the energy conversion device to halt operation of the energy conversion device if the distance of any of the protected party remote transceivers from the base unit transceiver is less than the predetermined threshold distance.

* * * * *